United States Patent [19]
West et al.

[11] Patent Number: 5,886,128
[45] Date of Patent: Mar. 23, 1999

[54] MODIFIED PHENOLIC RESIN AND USES RELATED THERETO

[75] Inventors: James C. West; Mark S. Pavlin, both of Lawrenceville, N.J.

[73] Assignee: Union Camp Corporation, Princeton, N.J.

[21] Appl. No.: 877,188

[22] Filed: Jun. 17, 1997

[51] Int. Cl.$^6$ .............................. C08G 8/32; C08G 14/04; C08D 11/06
[52] U.S. Cl. ...................... 528/158.5; 528/86; 106/31.35; 106/31.4; 106/31.73; 523/161; 524/611
[58] Field of Search .................................. 528/158.5, 86, 528/104; 106/31.35, 31.4, 31.73

[56] References Cited

U.S. PATENT DOCUMENTS

| | | | |
|---|---|---|---|
| 4,391,640 | 7/1983 | Okoshi et al. | 106/29 |
| 4,398,016 | 8/1983 | Homma et al. | 528/158.5 |
| 5,084,554 | 1/1992 | Minn | 530/212 |
| 5,167,704 | 12/1992 | Brower | 106/28 R |
| 5,198,024 | 3/1993 | Tuovinen et al. | 106/28 R |
| 5,405,932 | 4/1995 | Bender et al. | 528/104 |
| 5,635,591 | 6/1997 | Williams et al. | 106/31.73 |

OTHER PUBLICATIONS

Soltes and Zinkel, "Chemistry of Rosin," Zinkel and Russell (eds.), in *Naval Stores: Production, Chemistry, Utilization*, Pulp Chemicals Association, NY, 1989, Chapter 9, pp. 261–345.

Duncan, D., "Tall Oil Fatty Acids," Zinkel and Russell (eds.), in *Naval Stores: Production, Chemistry, Utilization*, Pulp Chemicals Association, NY, 1989, Chapter 10, pp. 346–439.

Burke, R., "Rosin–based Printing Inks," Zinkel and Russell (eds.), in *Naval Stores: Production, Chemistry, Utilization*, Pulp Chemicals Association, NY, 1989, Chapter 19, pp. 665–700.

*Primary Examiner*—Tae Yoon
*Attorney, Agent, or Firm*—Seed and Berry LLP

[57] ABSTRACT

Distilled tall oil may be reacted with phenol-containing organic compound, formaldehyde or reactive equivalent thereof and hydroxyl-containing non-phenolic organic compound to prepare a resin. The resin may be formulated with a colorant to provide an ink for lithographic printing.

29 Claims, 2 Drawing Sheets

Pimaric
6

Isopimaric
7

Sandaracopimaric
8

$\Delta^8$-Isopimaric
9

7,15-Pimaradienoic
10

$\Delta^8$-Pimaric
11

MODIFIED PHENOLIC RESIN AND USES RELATED THERETO

TECHNICAL FIELD

The present invention relates generally to resins, more specifically to modified phenolic resins, and to the use of such resins in inks and coatings, particularly inks for lithographic and letterpress printing.

BACKGROUND OF THE INVENTION

The reaction products of phenol or derivatives thereof with formaldehyde or reactive equivalents thereof are well known. See, e.g., Peter W. Kopf, "Phenolic Resins", *Encyclopedia of Polymer Science and Engineering*, vol. 11, pp. 45–94 John Wiley & Sons, N.Y., 1988. These resins may be used as binders in various inks and coatings, however their use is somewhat limited by their high cost. Less expensive phenolic-type resins are prepared when rosin is included among the reactants that form a phenolic resin. These so-called "rosin-phenolic" resins are widely used today in lithographic printing processes. See, e.g., Roger E. Burke, "Rosin-based Printing Inks", *Naval Stores*, Chapter 10, Pulp Chemicals Association (1989).

However, the increasingly popular use of rosin in other applications, such as tackifiers and other types of resins for various printing and coating processes, has increased competition for an essentially fixed amount of rosin, and increased the incentive to use alternatives to rosin-phenolic resins.

A by-product of the sulfate pulping process is crude tall oil (CTO), and a by-product of CTO fractionation is distilled tall oil (DTO). DTO is an impure material, containing at least three major classes of components. DTO does not have the resin acid content of rosin, nor the fatty acid content of TOFA, where rosin and TOFA are both obtained from CTO and have both found many commercial applications. Instead, DTO is an ill-defined mixture of various thermally-induced isomerization and dimerization products. To date, DTO has not received great commercial acceptance.

Accordingly, there is a need in the art for useful products that can take advantage of the unique composition and reactivity of DTO. There is also a need in the art for processes that can be used to convert/incorporate DTO into useful products. There is a further need in the art for viable alternatives to rosin-phenolic ink resins. The present invention addresses these long-standing needs, and provides other related advantages, as discussed below.

SUMMARY OF THE INVENTION

The invention provides a composition prepared from reactants, where the reactants include distilled tall oil, phenol-containing organic compound, formaldehyde or reactive equivalent thereof, and hydroxyl-containing non-phenolic organic compound. Typically, a majority of the resin acids in the distilled tall oil have a pimarane or isopimarane structure, and the distilled tall oil contains more $C_{20}$ fatty acids than $C_{18}$ fatty acids, on a weight basis. Typically, the distilled tall oil contains polycarboxylic acid having at least 36 carbon atoms. In a preferred embodiment, distilled tall oil constitutes at least 50 weight percent of the reactants used to form the resin. The reactants preferably include a catalyst or reaction rate enhancer, which speeds up the rate of reaction.

Another aspect of the invention provides a composition prepared from reactants which include polycarboxylic acid having at least 36 carbon atoms, phenol-containing organic compound, formaldehyde or reactive equivalent thereof, and hydroxyl-containing non-phenolic organic compound. The polycarboxylic acid having at least 36 carbon atoms is preferably provided by distilled tall oil.

The invention also provides a process for preparing a DTO-modified phenolic resin. The process includes the step of heating, within a temperature range of 100°–300° C., reactants including distilled tall oil, phenol-containing organic compound, formaldehyde or reactive equivalent thereof, and hydroxyl-containing non-phenolic organic compound.

In a further aspect, the invention provides a process for preparing a rosin-phenolic resin according to standard chemistry and procedures from rosin, phenol-containing organic compound, formaldehyde or reactive equivalent thereof, and hydroxyl-containing non-phenolic organic compound, however unlike standard chemistry and procedures, distilled tall oil is one of the reactants.

Yet another aspect of the invention is an ink composition which includes colorant and a resin prepared from various reactants including distilled tall oil, phenol-containing organic compound, formaldehyde or reactive equivalent thereof, and hydroxyl-containing non-phenolic organic compound.

These and other aspects of this invention will become apparent upon reference to the following detailed description and attached drawings.

DETAILED DESCRIPTION OF THE INVENTION

Figure 1:
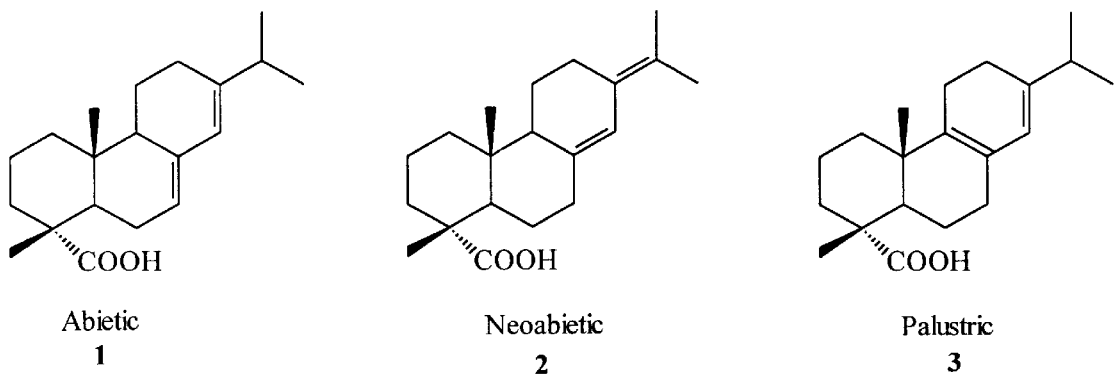
FIG. 1 sets forth the chemical structures of the principal members of the abietane family of resin acids.
Figure 1:
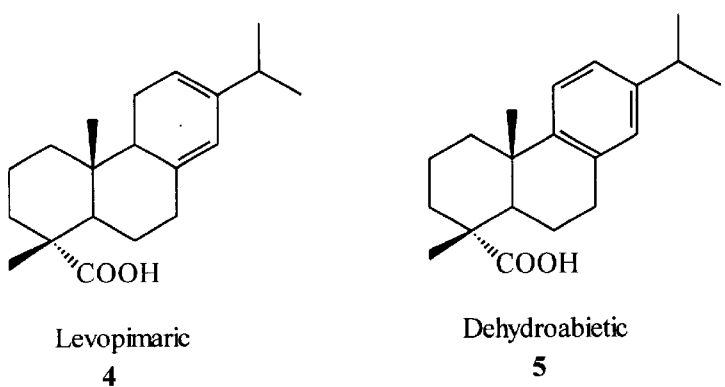

The present invention provides for the preparation of useful resins from distilled tall oil (DTO). In particular, it has been surprisingly found that DTO may be used to replace some or all of the rosin that is traditionally used to prepare rosin-modified phenolic resins, and yet still provide products that are useful binders in lithographic and letterpress inks.

The resins of the invention are prepared from components (which may also be called reactants or starting materials) which include DTO, phenol-containing organic compound (which may also be called a phenolic compound), formaldehyde or its reactive equivalent, and hydroxyl-containing non-phenolic organic compound (sometimes more simply referred to a hydric compound). Optional components may also be used to prepare a resin of the present invention.

Components Used To Prepare Resins Of The Invention

Distilled tall oil, which is frequently abbreviated as DTO, is obtained from crude tall oil (CTO), where CTO is a composition that is obtained as a result of practicing the sulfate wood pulping process. To fully appreciate the composition of DTO, a brief description of CTO and the preparation of DTO from DTO is helpful and is provided below.

CTO contains fatty acids and resin acids, in roughly equal amounts, along with some other components. While the fatty acids and resin acids are both monocarboxylic acids having 18–20 carbon atoms, these materials have different chemical structures, and thus the physical and chemical properties of fatty acids and resin acids are quite different. In order to take advantage of these different properties, distillation processes are commonly performed on CTO, to thereby obtain purified resin acids (commonly called rosin) and purified fatty acids (commonly called tall oil fatty acids, or TOFA). Both rosin and TOFA are well-known materials of commerce, and are widely used in a number of commercial products. In addition to rosin and fatty acids, CTO distillation yields one or more head cuts, a pitch residue, and of particular importance to the present invention, a material called distilled tall oil (DTO). These materials are obtained by the following, more precisely described process.

The CTO is heated to distill all volatile materials which include the components of heads, rosin, TOFA, and some material that ultimately ends up as DTO, yielding residue which is known as pitch. The distillate is then re-heated to distill a volatile fraction including the components of heads, TOFA, and further material that ultimately ends up as DTO, yielding residue called rosin, or tall oil rosin (TOR). The distillate from this process is then heated once again, to distill a heads fraction and a fatty acids fraction (TOFA), yielding residue known as distilled tall oil (DTO).

The exact composition of DTO is not completely known. What is clear however is that DTO is not crude tall oil, pitch, rosin or tall oil fatty acid, nor is it simply a blend of these materials. In fact, although DTO is distilled from CTO, the extensive heating employed during the distillations described above provides that DTO contains materials that are not even present in CTO. A general characterization of DTO is made difficult because it depends on the composition of the precursor CTO, which itself will vary depending on the identity of the trees from which the CTO was obtained and even the time of year that the trees were cut. Furthermore, there is also variability among CTO fractionators as far as the temperatures and pressures that are used during each distillation step and the duration of each step. These are important parameters because DTO is, to a large extent, the result of thermal isomerization, degradation and polymerization processes, and the degree to which each of these processes will occur is dependent on the fractionation conditions.

Figure 2:
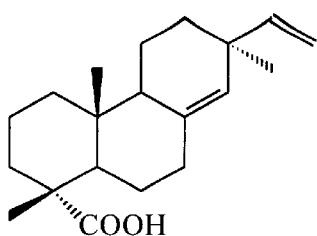
FIG. 2 sets forth the chemical structures of the principal members of the pimarane and isopimarane families of resin acids.
Figure 2:
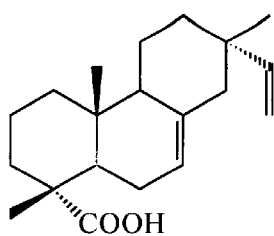
Figure 2:
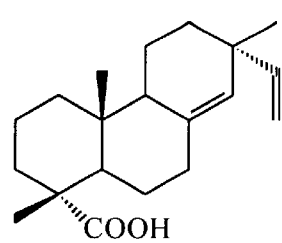
Figure 2:
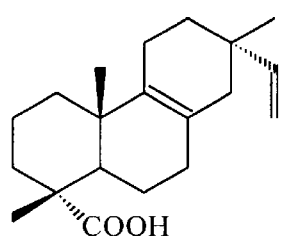
Figure 2:
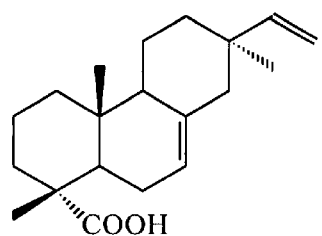
Figure 2:
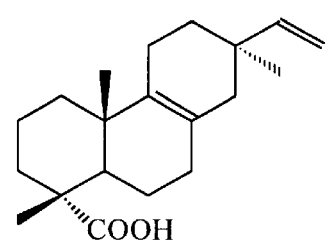

Roughly, DTO contains 20–45 weight percent of a fatty acid-like component, 15–35 weight percent of a rosin-like component, and 10–35 weight percent of a "less-volatile" component that has not been clearly traced to either resin or fatty acids. While rosin contains predominately abietane resin acids, DTO typically contains a predominant amount of pimarane resin acids. Chemical structures for the predominant members of the abietane family of resin acids are set forth in FIG. 1, while the structures for the predominant members of the pimarane and isopimarane families are set forth in FIG. 2.

DTO may be characterized by gas chromatography (gc). For example, DTO may be simultaneously exposed to high temperature and caustic, to cause hydrolysis of all ester bonds present in DTO. Then, diazomethane may be used to convert all of the carboxylic acid groups into methyl esters. This mixture of methyl esters is then applied to a gas chromatography column, and the components identified by reference to standards. By this procedure, a typical DTO contains about 15–35 weight percent resin acids (including materials which co-chromatograph with resin acids), about 20–45 weight percent fatty acids (including materials which co-chromatograph with fatty acids), and about 10–35 weight percent "less-volatile" material, by which is meant material that has a gc-retention time significantly longer than that of either methylated resin acids or methylated fatty acids. This gc technique may be used to identify and quantitate the resin acids and fatty acids present in DTO but not the "less-volatile" component.

In a typical DTO of the invention, resin acids of the pimaranes and isopimaranes constitute the majority of the resin acids present in the DTO. Also typically, resin acids of the abietane family constitute less than 10 weight percent of the DTO. Indeed, the total weight of the abietic acid, neoabietic acid and palustric acid is typically less than 10 weight percent of the total weight of the DTO, and more typically is less than 5 weight percent of the total weight of the DTO. Typically, resin acids of the pimarane and isopimarane families constitute at least 50 wt %, and more typically at least about 60 wt % of the resin acids present in the DTO.

The inventors have determined that a component of the "less-volatile" portion of a typical DTO is polycarboxylic acids. Preferred DTOs of the invention contain polycarboxylic acid, preferably in a concentration of at least 5 weight percent, and more preferably at least 10 weight percent, based on the total weight of the DTO. As used herein, a polycarboxylic acid is a molecule containing at least two carboxylic acid (—COOH) groups. The polycarboxylic acid component, since it is a component of the "less-volatile" material in DTO, has a fairly high carbon number. Furthermore, since it is presumably formed, at least in part, from TOFA fatty acids and/or the fatty acid-like and the rosin-like components of DTO, it has a carbon number on the order of 36–40 and above.

The inventors have also studied the composition of the fatty acid-like component of DTO. In contrast to TOFA, which consists almost entirely of linear $C_{18}$ fatty acids, the fatty acids of DTO appear greatly enriched in $C_{20}$ acids. The unsaturation level and chain-branching of these $C_{20}$ acids is unclear. Typical analyses of the total TOFA and fatty acid-like components of DTO and UNITOL® BKS, a high-quality TOFA product of Union Camp Corporation, are as follows:

| FATTY ACID COMPONENT | TOFA (UNITOL® BKS) | DTO (UNITOL® PDT) |
|---|---|---|
| Palmitic Acid | 0.3% | trace |
| Stearic Acid | 2.2% | 0.5% |
| Oleic Acid | 48.5% | 6.1% |
| Linoleic Acids | 41.6% | 4.1% |
| Other C-18 Acids | 7.1% | 12.9% |
| Other Fatty Acids* | 0.3% | 76.4% |
| Total | 100% | 100% |

*Eluting in the $C_{20}$ region of the gas chromatogram, after linolenic acid and prior to $D_8$-isopimeric resin acid.

Although the analysis of DTO varies because of its nature as a by-product intermediate distillation fraction, the above analysis illustrates that a DTO separated by good fractionation from TOFA typically contains a far higher percentage of non-$C_{18}$ fatty acids than refined TOFA.

Distilled tall oil is a recognized material of commerce, and may be obtained from businesses that fractionate crude tall oil. For example, Union Camp Corporation of Wayne, N.J., markets distilled tall oil under the trademark UNITOL® DT-22. Other fractionators of crude tall oil, who also market DTO, include Arizona Chemical Company (Panama City, Fla.), Georgia Pacific (Atlanta, Ga.), and Westvaco Corporation (Charleston, S.C.). UNITOLO® DTO is available in a variety of grades, where the grades are distinguished from one another by the weight percent resin acids present in the DTO. For example, UNITOL® DT-22 is a distilled tall oil product that contains about 22 weight percent resin acids. Any of the Union Camp DTO products may be used in the present invention. DTO from other suppliers, including Arizona Chemical Company, Georgia Pacific, and Westvaco Corporation may also be used.

A phenol-containing organic compound according to the invention has at least one hydroxyl group directly bonded to an aromatic ring. The parent phenolic compound is phenol itself. Other phenolic compounds are derivatives of phenol wherein 1 to 3 of the aromatic hydrogens are replaced with an equal number of substituents independently selected from hydroxyl; $C_1$–$C_{12}$ alkyl; $C_1$–$C_{12}$ alkyl substituted with 1 or 2 groups selected from hydroxyl and phenyl; phenyl; and phenyl substituted with 1 or 2 groups selected from hydroxyl and $C_1$–$C_{12}$ alkyl.

Specific derivatives of phenol include (unless otherwise stated, any two substituents may be in the ortho, meta or para relationship) cresols (including the ortho, meta and para cresols), 1,3,5-xylenols, iso-propylphenol, tert-butylphenol, amylphenol, octylphenol, nonylphenol, diphenylolpropane, phenylphenol, resorcinol, cashew nutshell liquid, bisphenol-A and cumylphenol. Preferred phenolic compounds have a single substituent in the para position (relative to the hydroxyl group), and include p-tert-butylphenol, p-octylphenol and p-nonylphenol.

The resins of the invention are prepared from formaldehyde (chemical formula $CH_2O$) or a reactive equivalent thereof Since formaldehyde is a gas at room temperature and ambient pressure, it is somewhat difficult to work with in a laboratory or commercial setting. Accordingly, use of a reactive equivalent thereof, such as a formaldehyde-generating compound in either liquid or solid form, is a preferred manner to introduce formaldehyde into a chemical reaction. For example, formaldehyde may be dissolved in water, where it forms "formalin", of chemical formula $HO(CH_2O)_nH$, where n is roughly 2. Formalins having both 36 wt % and 50 wt % formaldehyde activity are commercially available, and may be used in the practice of this invention.

A preferred reactive equivalent of formaldehyde is paraformaldehyde, which is a solid, water-free oligomer or polymer of formaldehyde. Parafonnaldehyde has the chemical formula $HO(CH_2O)_nH$ wherein n is on the order of 20 to 100. Paraformaldehye is commercially available from many sources, including Celanese (Dallas, Tex.). Other, less preferred sources of formaldehyde include trioxane and hexamethylenetetramine. Trioxane and hexamethylenetetramine are less preferred because their use necessitates special equipment and handling conditions in order to release formaldehyde activity from these chemicals.

The hydroxyl-containing compound may also be referred to as a hydric compound. In order to distinguish the hydroxyl-containing compound from phenolic compounds (which also have a hydroxyl group), the hydroxyl-containing compound is referred to as being "non-phenolic". The hydroxyl-containing compound is an organic compound having at least one hydroxyl (—OH) group. The hydroxyl-containing compound of the invention may be selected from $C_1$–$C_{36}$ monohydric compounds, $C_2$–$C_{36}$ dihydric compounds, $C_3$–$C_{36}$ trihydric compounds, $C_5$–$C_{36}$ tetrahydric compounds, $C_5$–$C_{36}$ pentahydric compounds and $C_6$–$C_{36}$ hexahydric compounds. The hydroxyl group is preferably primary, that is, attached to a carbon bearing two hydrogen atoms, or, less preferably, secondary, that is, attached to a carbon bearing one hydrogen atom. Tertiary hydroxyl groups are not preferred in the practice of this invention because they are typically unstable to the high temperature conditions required for ester formation.

Some non-limiting examples of $C_1$–$C_{36}$ monohydric compounds include butanol, hexanol, octanol, 2-ethylhexanol, 2-ethoxyethanol, decanol, hexadecanol, octadecanol, dodecanol, and the like, including primary and/or secondary hydroxyl groups. Some non-limiting examples of $C_2$–$C_{36}$ dihydric compounds include ethylene glycol, propylene glycol, diethylene glycol, triethylene glycol, butanediol, and the like, including primary and/or secondary hydroxyl groups. Some non-limiting examples of $C_3$–$C_{36}$ trihydric compounds include glycerol, trimethylolpropane, triethylolpropane and the like, including primary and/or secondary hydroxyl groups. Pentaerythritol and sugars are essentially the only commercially available, reasonably priced $C_5$–$C_{36}$ tetrahydric compounds, however other tetrahydric compounds could be used in the invention. Dimerized trimethylolpropane and sugars are some of the $C_5$–$C_{36}$ pentahydric compounds that could be used in the invention, while dimerized pentaerythritol (also known as dipentaerythritol) is a preferred example of a $C_6$–$C_{36}$ hexahydric compound.

Reaction rate enhancers according to the invention are well known in the art as catalysts for phenolic resin preparation. Typical reaction rate enhancers, sometimes called catalysts, are strongly acidic or alkaline compounds. Preferred reaction rate enhancers are the salts of a metal such as sodium, lithium, calcium, magnesium and zinc. The salts may be the acetate, carbonate, bicarbonate, formate, hydroxide, oxalate or oxide of a metal. Magnesium carbonate, magnesium bicarbonate, magnesium acetate, magnesium formate and magnesium oxalate are preferred. Amines, particularly tertiary amines such as triethylamine, are another suitable class of reaction rate enhancers.

In addition to the above-listed required components, one or more optional components may be used to prepare resins of the invention. It is the inventors' surprising discovery that a resin, suitable for use as, for example, a binder in lithographic or letterpress inks, may be prepared from the components described above, in the absence of rosin. However, the resin of the invention is by no means incompatible with rosin, and rosin may be present among the reactants used to form a resin of the invention.

Rosin is mainly a mixture of $C_{20}$, tricyclic fused-ring, monocarboxylic acids, typified by abietic acid, which are commonly referred to as resin acids. Rosin can be obtained from many sources, and can have a wide range of purities. For example, wood rosin may be employed in the invention, where wood rosin is obtained from Pinus stumps after harvesting the stumps, chipping the stumps into small chips, extracting the chips with hexane or higher-boiling paraffins, and distilling the hexane or paraffin and fatty acids to yield wood rosin. Gum rosin, which is the name given to rosin that is obtained after scoring a pine tree, collecting the exudate sap, and then distilling away the volatile components and most of the fatty acids, may also be employed in the invention.

Preferably, the rosin is tall oil rosin, which is a byproduct of the Kraft, i.e., sulfate, pulping process for making paper. According to this process, pinewood is digested with alkali and sulfide, producing tall oil soap and crude sulfate turpentine as by-products. Acidification of this soap followed by fractionation of the crude tall oil yields tall oil rosin and fatty acids.

Rosin is typically characterized by its acid number, and rosins having acid numbers ranging from about 160 to about 180 are preferred according to the invention. Preferably, the tall oil rosin has undergone distillation so as to have less than about 5 weight percent tall oil fatty acids. A preferred rosin is available commercially from Union Camp Corporation, Wayne, N.J., under the UNITOL® trademark.

Prior to preparing a resin of the present invention, the rosin may be subjected to one or more treatments such as crystallization, disproportionation, partial or complete hydrogenation, dimerization, formaldehyde modification, modification with unsaturated mono-acids (or alkyl monoester thereof) or diacids (or mono- or di-alkyl esters thereof) such as acrylic acid, methacrylic acid, itaconic acid, fumaric acid and maleic anhydride and the like, or to some combination of these treatments. Also, after performing any of the above treatments on the rosin, the rosin may be subjected to distillation, to provide a distillative fraction that is suitably employed in the invention. Such treatments can be used, for example, to modify the melt point of the resin of the present invention. Such treatments are known to those skilled in the art, and indeed many rosins having undergone such treatments are commercially available.

When present among the components used to prepare a resin of the invention, the rosin typically constitutes less than about 50%, more typically less than about 40%, and still more typically less than about 30% of the entire weight of the resin forming components.

Another optional component is a hydrocarbon resin. While hydrocarbon resins have diverse structures, depending on the raw materials from which they are made, the class of resins known as hydrocarbon resins is well known in the art. Hydrocarbon resins are sold by, e.g., Hercules Incorporated (Wilmington, Del.), Ashland Chemical Co. (Columbus, Ohio.), Arizona Chemical Co. (Panama City, Fla.), Lawter International (Northbrook, Ill.), and Neville Chemical Co. (Pittsburgh, Pa.), among many other suppliers. Typical raw materials for the production of hydrocarbon resins are ($C_5$–$C_9$)-hydrocarbons, and include cyclopentadiene, piperylene, dicyclopentadiene, coumarone, indene (these later two hydrocarbons are used to form the well known coumarone-indene resins), isoprene and styrene.

When present, the hydrocarbon resin component contributes less than about 60% by weight, preferably less than 45% by weight, more preferably less than 30% by weight and still more preferably less than 20% by weight of the total weight of the resin. Hydrocarbon resins are currently included in lithographic ink resins sold in the art, and may be included in resins according to the present invention for the same reasons they are currently found useful in known resins.

Still another optional component is an $\alpha,\beta$-unsaturated carboxylic compound. The $\alpha,\beta$-unsaturated carboxyl compound has an olefinic unsaturation adjacent to the carbon atom of a carboxyl group, i.e., has the —C═C—C(═O)—O— arrangement of carbon and oxygen atoms. The olefin group in an $\alpha,\beta$-unsaturated carboxyl compound is reactive with rosin, to form an adduct therebetween. When the $\alpha,\beta$-unsaturated carboxyl compound is maleic anhydride, the adduct is known as maleated rosin. When the $\alpha,\beta$-unsaturated carboxyl compound is fumaric acid, or an ester of fumaric acid, the adduct is known as fumarated rosin. Even when rosin is not present, the $\alpha,\beta$-unsaturated carboxylic compound may react with various components of the resin-forming reaction, e.g., the DTO and/or the hydric component.

Suitable $\alpha,\beta$-unsaturated carboxylic compounds include maleic anhydride, fumaric acid, mono($C_1$–$C_{12}$alkyl) ester of fumaric acid, di($C_1$–$C_{12}$alkyl) ester of fumaric acid, acrylic acid, $C_1$–$C_{12}$alkyl ester of acrylic acid, methacrylic acid, $C_1$–$C_{12}$alkyl ester of methacrylic acid, itaconic acid, and $C_1$–$C_{12}$alkyl ester of itaconic acid. Maleic anhydride, fumaric acid and esters of fumaric acid are preferred $\alpha,\beta$-unsaturated carboxylic compounds, with maleic anhydride being most preferred.

When present, the $\alpha,\beta$-unsaturated carboxylic compound constitutes about 0.1 to 5% by weight, preferably 1 to 3% by weight, of the total weight of the components.

Properties Used To Characterize Resins Of The Invention

The present invention provides for DTO-modified phenolic resins. These resins may be characterized by their properties, which include acid number, melting point, molecular weight distribution and solubility. In addition, a varnish prepared by combining the DTO-modified phenolic resin with an organic liquid may be characterized by its properties, including clarity, concentration of resin, rheology and ink oil tolerance (dilutability). For convenience, one of ordinary skill in the art often refers to the varnish properties as being properties of the resin itself, e.g., the "dilutability of the resin is X". This convention may be adopted herein, also for convenience. In any event, these properties are routinely measured for rosin-modified phenolic resins, and thus one of ordinary skill in the art is familiar with techniques to measure these properties. Nevertheless, a brief description of techniques to measure these properties is provided here.

Acid number is measured by dissolving a known weight of resin into an organic solvent (toluene is a typical solvent), and then titrating a measured amount of methanolic potassium hydroxide (KOH) solution into the resin solution. The titration is complete when a pH of about 7 is attained. The acid number of the resin is equal to the amount of KOH, in mg, which was used in the titration, divided by the weight of resin, in grams, in the sample which was titrated. In other words, acid number is equal to the mg of KOH needed to neutralize 1 gram of sample. The acid numbers described and reported herein were obtained by titration.

Melting point, which may also be referred to as "softening point", may be measured by the so-called "ring and ball" method, which is the subject of ASTM E28. Alternatively, a softening point value may be obtained using a Mettler FP80 Central Processor and a Mettler FP83 HT Dropping Point Cell employing a softening point ring. This apparatus is available from Mettler Laboratories (Heightstown, N.J.). The melting point values described and reported herein were obtained using a Mettler FP83HT apparatus.

Information about a resin's ink oil tolerance is obtained from dilutability testing. According to this test, a 45 weight percent solution of resin is prepared with M47:TXIB mixed solvent (1:1 weight ratio; M47 is Magiesolm™ M-47, a so-called "technical white oil", from Magie Brothers, Franklin Park, Ill., presently a division of Pennzoil Products Company; TXIB is a plasticizer ester of the chemical name 2,2,4-trimethyl-1,3-pentanediol diisobutyrate sold by Eastman Chemical, Kingsport, Tenn.). Typically, 10 grams of resin solution equilibrated to room temperature is placed in a clean 100 mL glass beaker and a piece of black-on-white printed paper (print font size about 10–12) is placed under the beaker. Then aliquots of M47 are added dropwise and the solution stirred until the solution becomes cloudy to the point where the print under the beaker may no longer be read. The total solution weight (after being titrated to cloudiness by M47) is multiplied by 100 and divided by the original ten gram weight to provide a dilutability result in terms of "percent dilutability".

Once a test varnish has been prepared, it may be characterized in terms of its rheology. Instruments which measure rheological values of a varnish are commercially available from, for example, Rheometric Scientific (Piscataway, N.J.), Haake (Paramus, N.J.), ATS Rheosystems (Wrightstown, N.J.), and TA Instruments (New Castle, Del.), and are commonly called rheometers. Rheological values as reported herein were obtained using a Rheometric Fluid Spectrometer, which is an oscillating rotary rheometer. This rheometer characterizes the viscoelasticity of a varnish in terms of elastic component (the elastic modulus G') and the viscous component (the loss modulus G"). The G' and G" values are measured as a function of the angular velocity ($\omega$) of the oscillating rotary viscometer measured in radians per second ($s^{-1}$). Varnishes without a gel structure have a substantially viscous behavior and show high G" values, whereas G', in comparison with G", gives relatively low values. As the gel character of the resin increases, the elastic component, and thus the value of G', increases, while the value of G" decreases. In the rheology literature, the ratio G"/G' or "tangent of delta" (tan$\delta$) is used as a convenient descriptor of the viscoelasticity of a material. Low tan $\delta$ values, then, signify that a varnish has a gel-like character, while high tan $\delta$ values indicate that the varnish has little or no gel-like character.

In order to determine the relative gel-like character of varnishes prepared from resins of the invention, a standard protocol for varnish preparation was used. Thus, a 35 or 45 weight percent solution of the resin in a solvent consisting of equal weights of Magiesol 47 and Eastman TXIB was prepared. This typically required comminution of the resin, blending resin and solvent, then heating and stirring this blend. The viscoelasticity characterization of the varnish was performed only after the varnish was at room temperature (25° C.). Varnishes prepared in this manner were characterized in terms of tan $\delta$ and pseudoplasticity (shear-thinning).

Preferred Resins Of The Invention

To a large extent, the actual value of each property of a resin is independent of the value of another property. However, preferred resins of the invention have certain values for the above exemplary properties which fall within certain specified ranges, as will next be discussed.

In one embodiment of the invention, a DTO-modified phenolic resin is a so-called "hard resin", in that it has a melting point of at least about 90° C. Preferably, the hard resin has a melting point of at least about 100° C., and still more preferably at least about 110° C. Hard resins having relatively higher melting points are preferred because they are more easily prepared in a commercial manufacturing process. Lower melting point resins are more difficult to form into the small flake-like particles most preferred by consumers of hard resins because such particles tend to be ductile while still warm and, furthermore, tend to remass after flaking. Also, paper printed with inks prepared from higher melting hard resins tend to demonstrate greater blocking (sticking) resistance, which is a desirable performance property.

The hard resin may have a melting point as high as about 200° C. While resins with even higher melting points may be prepared, it is typically the case that such resins contain a substantial amount of material which is insoluble in solvents commonly used to prepare inks. Accordingly, melting points of about 90°–180° C. are preferred, and about 100°–150° C. are more preferred, for the hard resins.

Hard resins preferably have an acid number of less than 50, more preferably have an acid number within the range of 10 to 40, and still more preferably have an acid number of about 15 to 35. Empirical evidence suggests that when the acid number exceeds about 50, lithographic inks prepared from such resins have inferior performance properties. Although resins having an acid number below about 10 may be used to prepare a satisfactory lithographic ink, it is practically difficult to prepare such resins because a long reaction time and a large excess of hydroxyl equivalents (relative to carboxyl equivalents) are needed.

Preferred hard resins are soluble in the ester and hydrocarbon oil solvents which are commonly used to prepare lithographic and letterpress inks. Magiesol™ 47 is an aliphatic solvent that sees widespread use in the manufacture of lithographic inks, and thus preferred resins of the invention are completely soluble in Magiesol™ 47 from Magie Brothers, Franklin Park, Ill.

In another embodiment of the invention, the DTO-modified phenolic resin is a viscous oil, hereinafter a "DTO phenolic oil". A DTO phenolic oil is fluid or a semi-soft solid at room temperature, thus having a melting point of less than about 40° C. As described in more detail below, DTO phenolic oil is typically prepared from reactants that include a phenolic compound substituted with a relatively longer-chain alkyl group, and a high molecular weight monohydric alcohol, such as decanol, dodecanol, tetradecanol, hexadecanol, or Harchemex™ alcohol from Union Camp. The DTO phenolic oil typically incorporates little or no resin. In one embodiment, the DTO phenolic oil is prepared in the absence of hydric compound, in which case there is little or no hydroxyl functionality to react with the acid group of the DTO. Accordingly, the acid number of a DTO phenolic oil prepared in the absence of hydric compound will typically be higher than that of a hard resin described above. The acid number of a DTO phenolic oil prepared without hydric compound is typically 70–150.

In a preferred embodiment of the invention, the resin, whether it is "hard" or an oil, is "self-gelling". When a resin is combined with an organic solvent to form a varnish and that varnish has gel-like character even in the absence of traditional aluminum gelling agents, then that resin is "self-gelling" according to the present invention. For a resin to have gel-like character according to the invention, the varnish prepared from the resin must have a tan $\delta$ value of less than 3 (measured at 25° C., 1% strain, and a frequency of about 16 $s^{-1}$), and/or a maximum shear-thinning slope (absolute value of the derivative of the log(complex viscosity) vs. log(frequency) curve, in the frequency range of 0.05–100 $s^{-1}$) of at least 0.20. The varnish is prepared at either 35 or 45 wt % solids resin in 1:1 Magiesol 47/Eastman Kodaflex TXIB as described above.

Preparation of DTO-Modified Phenolic Resins

In preparing a DTO-modified phenolic resin according to the invention, both the relative amounts of the various components that will be used to form the resin, as well the process parameters, must be considered. "Process parameters" refers to the order in which the components are combined, the temperatures to which the components and intermediate products are exposed, the duration of reaction time, etc.

Of course, the proportional amounts of the reactants and the precise process conditions will be partially determined by the desired properties for the product resin. As described above, the resin may be a "hard" resin, i.e., a resin having a melting point of greater than about 90° C., or it may be a viscous oil at room temperature. The resin may also be self-gelling, i.e., a varnish prepared from a DTO-modified phenolic resin and a liquid hydrocarbon has gel-like character in the absence of traditional gel-forming additives. The following general statements may be made which apply to all DTO-modified phenolic resins of the invention. Where appropriate, comments directed to preparing preferred embodiments of the inventive resin are also provided. For convenience, it may be stated that a resin of the invention contains stated amounts of specified materials, even though more precisely it should be stated that the mixture of starting materials used to form the resin contains the stated amount of the specified material.

The DTO provides at least about 10% of the total weight of the components of the resin, with higher amounts, such as 20%, 30%, 40%, 50% and 60% being even more preferred. Because DTO is typically the least expensive component (on a weight basis) of the inventive resins, it is desirable to maximize the proportion of DTO in the reactive components, which includes the rosin component, if present. A typical DTO-modified phenolic resin contains 20–50 weight percent DTO, based on the total weight of the resin. Preferred resins of the invention contain less than 50 weight percent rosin based on the total weight of the components, and more preferably contain less than 40 weight percent rosin based on the total weight of the components.

The molar ratio of phenolic compound to formaldehyde or equivalent is preferably within the range from 1:1 to 1:4, and more preferably 1:1.7 to 1:2.5, although it may be varied within wide limits. It is preferred to use a molar excess of formaldehyde or equivalent compared to the moles of phenolic compound. If the phenolic compound and formaldehyde or equivalent are reacted together, and then that reaction product combined with the other resin-forming components, then that phenolic/formaldehyde reaction product typically contributes up to about 45% by weight of the total weight of the components, and preferably contributes about 15–25 weight percent.

The weight ratio of DTO to the sum of the phenolic compounds and formaldehyde or equivalent may likewise vary over a wide range. In general, preferred resins of the invention have a weight ratio of DTO to the sum of the phenolic compounds and formaldehyde or equivalent of from about 1:3 to about 1:0.5, more preferred about 1:2 to 1:1.

The hydric compound typically constitutes about 5 to about 25 weight percent of the total weight of the components. The exact amount of hydric component is influenced by the functionality of the hydric component, the amount of DTO used, and the desired acid number of the product resin. For example, if the hydric component is entirely or predominantly multifunctional, i.e., a polyol, then less of the hydric component may be used than if the hydric component is entirely or predominantly monofunctional, i.e., a monoalcohol. Polyfunctional hydric components tend to cause gelation of the resin of the invention, however also increases the melting point of the resin which is typically beneficial when the resin will be used in a lithographic ink formulation. Because DTO contains polyfunctional carboxylic acids as detailed above, resins containing higher amounts of DTO have a greater tendency to gel during reaction than resins containing lesser amounts of DTO. To compensate for this tendency, relatively more of the monofunctional hydric components must be used. In the preferred resins of the invention, the total amount of hydric component is typically adjusted so as to esterify about 100% of the carboxylic acid groups contained in the DTO, the $\alpha,\beta$-unsaturated carboxylic compound, and the rosin components of the resin.

Thus, the weight of polyol present in the combined weight of the components used to make the preferred resins of the invention is preferably about 0.5 to about 10 weight percent, and more preferably is about 2 to about 8 weight percent. The weight of monohydric component present in the combined weight of the components used to make the preferred resins of the invention is preferably about 0 to about 15 weight percent, and more preferably is about 0 to about 12 weight percent. The combined hydric compounds preferably constitute about 8 to about 15 weight percent of the total weight of the components.

The reaction rate enhancer contributes a minor portion of the total weight of the components used to prepare a resin of the invention. The reaction rate enhancer preferably constitutes less than 3 weight percent, more preferably less than 2 weight percent, and still more preferably less than about 1 weight percent of the total weight of the components used to form a resin of the invention. While greater amounts of reaction rate enhancer might be employed, little or no increase in reaction rate is observed, the cost of the formulation may increase, and residual reaction rate enhancer can be detrimental to the appearance and/or performance properties of the resin. However, at least about 0.01 weight percent, preferably at least about 0.3 weight percent, and more preferably at least about 0.4 weight percent of reaction rate enhancer is present in order to provide significant amounts of rate enhancement.

The DTO, phenolic compound, formaldehyde and hydric compound preferably constitute the majority, on a weight basis, of the components used to form a resin of the present invention. More preferably, these four components constitute at least about 60%, and still more preferably at least about 70% (on a weight basis) of the entire weight of the components used to form the inventive resin.

The resins of the invention may be prepared by reacting together components comprising (A) distilled tall oil; (B) phenolic compound; (C) formaldehyde or equivalent; (D) reaction rate enhancer and, (E) hydric compound, where each of these components has been described above. In addition, optional components may be used to form a resin of the invention, where preferred optional components have also been described above. Essentially any reaction conditions recognized in the art for preparing rosin-modified phenolic resin (including derivatives thereof) may be employed to prepare a resin of the present invention, where the present invention provides that DTO is used in lieu of some or all of the rosin which is employed in the prior art processes.

As used above, the term "reacting together" means that each of the listed components is added to a reaction vessel under reaction conditions such that each component reacts with either a) another component, or b) a reaction product formed from two or more other reaction components. In order for the components to undergo a resin-forming reaction, combinations of the components must be exposed to an elevated temperature in the range of 100°–300° C. At these elevated temperatures, the components undergo covalent bond-forming reactions with other components, so that a high molecular weight product is formed.

For example, each of the components may be combined in a single reaction vessel, and the combination taken to elevated temperature so that the components react with one another to form a resin of the invention. This approach may be termed a "one-pot" reaction process.

Alternatively, two or more (but less than all) components may be combined in a single reaction vessel, and this combination taken to elevated temperature so that the component members react with one another to form an intermediate reaction product. Then other components are reacted with the intermediate reaction product. For example, the phenolic compound and the formaldehyde or equivalent may be reacted together to form a phenolic resin in accordance with known methods. Typical reaction conditions to form a phenolic resin are to combine the phenolic compound and formaldehyde or equivalent in the presence of a catalyst, preferably a basic catalyst such as sodium hydroxide. The combination is then taken to elevated temperature, typically between 50° C. and 160° C., preferably 60° C. to 100° C., under normal pressure or elevated pressure in an autoclave. The resulting phenolic resin can then be added to the DTO and other reaction components, in an amount corresponding to the amount of phenolic compound and formaldehyde or equivalent that would otherwise be used. However, it is preferred that the phenolic compound and formaldehyde or equivalent be reacted together in the presence of the DTO.

Thus, the invention provides that the components may be reacted with one another in any order, at temperatures within the range of 100°–300° C., to obtain a resin of the invention. It should be recognized however that the same components (in terms of quantity and identity) may form resins with different properties, depending on the precise manner in which the components are reacted together.

Exemplary components and processes to prepare a hard resin of the invention are set forth in Examples 1–6 herein. In a preferred process to prepare a hard resin of the invention, a reaction flask is charged with DTO, phenolic compound and monohydric alcohol. Some silicone antifoam compound is also preferably present, as it may reduce undesired foaming during resin preparation. This combination is preferably maintained under a nitrogen atmosphere (preferably a blanket of nitrogen rather than a purge) in order to minimize air oxidation of the components. This combination is heated to homogeneity, typically about 115° C. is sufficient (a higher temperature being necessary if the phenolic component possesses a melting point higher than 115° C.), and then formaldehyde or equivalent and reaction rate enhancer are added at 115° C. while the reacting mixture is agitated. After about 1–6 hours at about 115° C., the reaction temperature is increased to about 170°–200° C., and water which is formed during the reaction is collected with the aid of a nitrogen purge. The α,β-unsaturated carboxylic compound may be added at this stage and after it has reacted, the temperature is then further increased to about 260° C., with continued collection of the water formed by the reaction. A temperature of about 260° C. is maintained, and water collection is maintained, until the acid number of the reacting mixture reaches less than about 50. Then polyhydric alcohol is added and the reactor maintained at about 260° C. until the acid number of the product reaches about 20–25. At this point the hard resin of the invention has been formed, and is discharged from the reactor.

Alternative reactant charging procedures and temperature profiles may be employed to prepare a resin of the invention. It is typically necessary however for the reacting components to be held for some time within the temperature range of about 230° C. to about 280° C., in order for the bulk of the hydroxyl and carboxyl groups to react with one another (esterification), and the acid number to reach a desirably low number. Some mechanism to remove the water formed by the reaction is also typically necessary, where a nitrogen purge through the reacting mixture, and/or adding an organic solvent to the mixture to provide for azeotropic distillation of a water-containing mixture, and/or reduced pressure may be employed for this purpose.

The reaction temperature(s) is selected with the following points in mind. The reaction temperature must be high enough that the contents of the reaction vessel are sufficiently fluid to allow those contents to be stirred. Higher temperatures are generally preferred for reasons of economy, in order to provide a faster rate of reaction. However, the reaction temperature should not be so great that the reaction components boil out of the reaction vessel. Nor should the temperature be so great that decomposition of the reaction components or reaction products should occur.

The DTO-modified phenolic resin forming reaction is preferably conducted in the absence of organic solvent. Under solventless reaction conditions, the reaction temperature must be above the melting point of the reaction components and/or reaction product. This factor sets a lower practical reaction temperature of at least about 100° C. The reaction between phenolic compound and formaldehyde or equivalent occurs at about 50°–100° C., and thus a temperature of about 100°–130° C. is a good initial temperature for the DTO-modified phenolic resin-forming reaction.

The DTO-modified phenolic resin forming reaction generates water as a byproduct of the covalent bonds that are formed between members of the reaction components. In order to drive the reaction toward completion, this water should be removed. In the absence of vacuum or azeotrope formation, a reaction temperatures of at least 100° C. is needed in order to distill water away from the reacting components. Thus, at least during the initial stage(s) of DTO-modified phenolic resin formation, the reaction temperature is desirably set to about 100°–125° C. While a higher initial reaction temperature may be used, the consequence may be water generation at a rate which is much greater than water removal may be conveniently accomplished.

As the resin-forming reaction proceeds, a high molecular weight product forms. In a preferred embodiment of the invention, this reaction product may have a melting point of about 100°–140° C. Thus, in order to maintain the contents of the reaction vessel in a fluid state, it is necessary to have the reaction temperature above the melting point of the product resin. Therefore, the reaction temperature is preferably gradually raised as the reaction between the components proceeds.

In order to achieve complete reaction, it is typically necessary to raise the temperature to about 250°–300° C. While reaction temperatures higher than 300° C. might be used, degradation of the reaction product becomes a significant problem, and thus such higher temperatures are preferably avoided. Therefore, after some time at about 100°–125° C., the contents of the reaction vessel are gradually heated to about 250°–300° C., with collection of water that is formed as a byproduct of the reaction.

In order to drive the reaction to completion, removal of water may be enhanced through addition of an organic solvent which forms a low-boiling azeotrope with water, and/or the addition of a light vacuum on the reaction vessel. To provide a low-boiling azeotrope, an organic solvent which forms an azeotrope with water, e.g., toluene or xylene, is added to the reaction vessel, and then removed by distillation, initially under normal pressure, and at the end under vacuum at pressures of between 1000 and 0.1 mbar, preferably 200 to 50 mbar, and temperatures of up to 300° C., preferably of up to 280° C.

The reaction components are maintained at about 250°–300° C. until the reaction is considered finished. Reaction progress is conveniently monitored by taking samples of the reaction mixture and measuring the acid number of those samples. Initially, the acid number of the reaction mixture may be as high as about 300. The acid number will gradually fall as the resin-forming reaction proceeds. For a hard resin according to the invention, the acid number is preferably less than about 50. Melting point (softening point), melt viscosity, and/or solution viscosity measurements may also be made to monitor reaction progress.

Ink Composition Using DTO-Modified Phenolic Resin

The present invention provides an ink, suitable for lithographic (also called offset) or letterpress printing. The ink contains a DTO-modified phenolic resin as disclosed herein, in addition to a hydrocarbon or ester solvent, e.g., a mineral oil (which together form a varnish) and a colorant or other pigment. The ink may additionally contain any number of optional components, where the optional components provide for improvements in the performance of the ink. Ink performance properties include gloss, scuff resistance, block resistance and many other properties. Suitable optional components include, without limitation, vegetable oil, alkyd resin, hydrocarbon resin and wax.

In order to optimize the transfer property of the ink from the printing plate to the substrate, it is necessary for the ink to have an appropriate low tack value. Ink with a gel-like character is particularly preferred in lithographic printing because it has good transfer properties with low tack. For example, upon printing with an ink having a gel structure, the raster points are advantageously sharply printed and, when the hydrocarbon solvent is absorbed into the substrate, there is little or no bleeding of the ink and thus no blurring of the printed image. These performance properties are particularly important during high-speed printing.

To obtain gel-like character, gel-forming agents may be added to a varnish intended for a lithographic ink. Aluminum compounds, such as aluminum alkoxides are commonly used gel-forming agents, and may be present in an ink according to the present invention. A varnish having gel-like character may be prepared by dissolving the binder resin in a hydrocarbon solvent at elevated temperature, typically at about 160° to 180° C., then adding the gel-forming agent and allowing the solution to cool to room temperature. One of ordinary skill in the art is familiar with preparing gel-like lithographic varnishes using gel-forming agents, and may adopt other procedures for preparing such a varnish. However, as described above, the resin of the invention may be "self-gelling", in which case it may be used to form a gel-like varnish without addition of a traditional gelling agent.

The invention is illustrated in more detail by the following examples. In the examples, UNITOL® DT-22 DTO and Harchemex® alcohols were obtained from Union Camp Corporation, Wayne, N.J. Paraformaldehyde was obtained from Celanese. Aldrich Chemical is located in Milwaukee, Wis. Monopentaerythritol was obtained from Hercules Incorporated, Wilmington, Del.

EXAMPLES

Example 1

A 3 resin kettle was charged with 541.4 g UNITOL® DT-22 DTO, 200.8 g dodecanol (Aldrich Chemical, Catalog No. 12,679-9, 98%), 600.8 g p-tert-butyl phenol (Aldrich, Catalog No. B9,990-1), and 0.3 g Dow Corning FS1265 1000 cSt antifoam fluid. The kettle was fitted with a nitrogen supply, an air stirrer, a water-cooled condenser, and a thermocouple for temperature control and fitted into a heating mantel. The nitrogen supply was set to provide a blanket under the slight pressure of a mineral oil bubbler. The mixture was heated to 115° C. at which point it was homogeneous. At 115° C. the kettle was additionally charged with 152.5 g paraformaldehyde (Celanese) and 5.5 g magnesium oxide. The reaction was held at 110° C. under the nitrogen blanket for four hours. At the end of this period the nitrogen blanket was replaced by a slow nitrogen flow while a Barrett trap was introduced to allow for the collection of reaction water. The temperature was increased to 200° C. When 200° C. was reached the reactor was returned to room temperature for overnight. The following day the reactor was heated to 260° C. while taking off water into the Barrett trap. When the acid number reached 49, nitrogen flow was stopped and a vacuum of 100 mm Hg was applied to the reactor. After three hours at 100 mm and 260° C. the reactor contents were poured out and allowed to cool. The next day 500 g of the reaction mixture was placed in a 1 L kettle and heated to 200° C. Then 11.9 g of monopentaerythritol was added and the mixture heated to 260° C. At 260° C. vacuum was applied (100 mm Hg) for an additional three hours. At the end of this three hour period the reactor was returned to room temperature and pressure for overnight. On the final day of reaction the reactor contents were reheated to 260° C. and pressure was reduced to 50 mm Hg for 4.8 hours. The reactor was discharged and the following tests were carried out to characterize the resin product:

Acid number 23
Mettler Softening Point 126° C.
Complex Viscosity* @ 1 rad/sec 262 Poise
Tan delta* @ 16 rad/sec 0.50
Peak pseudoplasticity* @ 16 rad/sec 0.73
* Measured with a Rheometric Fluid Spectrometer at 25° C. on a 35 wt % solution of resin in 1:1 Magiesol 47/Eastman TXIB.

Example 2

A 3 L resin kettle was charged with 533.5 g UNITOL® DT-22 DTO, 197.9 g HARCHEMEX® alcohols, 592.0 g p-tert-butyl phenol (Aldrich B9,990-1), and 0.3 g Dow Corning FS 1265 1000 cSt antifoam fluid. The kettle was fitted with a nitrogen supply, an air stirrer, a water-cooled condenser, and a thermocouple for temperature control and fitted into a heating mantel. The nitrogen supply was set to provide a blanket under the slight pressure of a mineral oil bubbler. The mixture was heated to 115  C. at which point it was homogenous. At 115° C. the kettle was additionally charged with 149.3 g paraformaldehyde (Celanese) and 5.4 g magnesium oxide. The reaction was held at 106°–110° C. for four hours. At the end of this period the nitrogen blanket was replaced by a slow nitrogen flow while a Barrett trap was introduced to allow for the collection of reaction water. Temperature was increased to 200° C. When 200° C. was reached the reactor was returned to room temperature for overnight. The following day the reactor was heated to 200° C., 21.9 g of monopentaerythritol (Hercules Incorporated, Wilmington, Del.) was added, and the reaction was heated to 260° C. while removing water. When an acid number of 48 was obtained the nitrogen flow was stopped and vacuum was slowly applied to the reactor, reducing pressure to 100 mm Hg. After one hour at 100 mm and 260° C. the reactor was returned to room temperature and pressure for overnight. The next day the reaction mixture was heated to 260° C. Vacuum was applied at 100 mm Hg for an additional six hours. At the end of this period the reactor was returned to room temperature and pressure for overnight. On the final day of reaction the reactor was reheated to 260° C. and pressure was reduced to 50 mm Hg for 5.5 hours. The reactor was discharged and the following tests were carried out on the reaction product, with the indicated results:

Acid number 20
Mettler Softening Point 95° C.
Complex Viscosity* @ 1 rad/sec 235 Poise
Tan delta* @ 16 rad/sec 1.21
Peak pseudoplasticity* @ 16 rad/sec 0.45
Aliphatic dilutability using M-47 >1700 %
*Measured with a Rheometrics Fluid Spectrometer at 25° C. on a 45% solution of resin in 1:1 Magiesol 47/Eastman TXIB.

17

Example 3

A 3 L resin kettle was charged with 533.5 g UNITOL® DT-22 DTO, 197.9 g HARCHEMEX® alcohols, 592.0 g p-tert-butyl phenol (Aldrich, Catalog No. B9,990-1), and 0.3 g Dow Corning FS1265 1000 cSt antifoam fluid. The kettle was fitted with a nitrogen supply, an air stirrer, a water-cooled condenser, and a thermocouple for temperature control and fitted into a heating mantel. The nitrogen supply was set to provide a blanket under the slight pressure of a mineral oil bubbler. The mixture was heated to 115° C. at which point it was homogeneous. At 115° C. the kettle was additionally charged with 149.3 g paraformaldehyde (Celanese) and. 5.4 g magnesium oxide. The reaction was held at 106°–110° C. under the nitrogen blanket for four hours. At the end of this period the nitrogen blanket was replaced by a slow nitrogen flow while a Barrett trap was introduced to allow for the collection of reaction water. Temperature was increased to 200° C. then the reaction mixture discharged and allowed to cool. A portion of the reaction mixture (500 g) was then placed in a 1 L resin kettle, heated to 200° C., 14.6 g of monopentaerythritol was added, and the reaction mixture heated to 260° C. while removing water. When an acid number of 48 was obtained the nitrogen flow was stopped and vacuum was slowly applied to the reactor, reducing pressure to 100 mm Hg. After 4.5 hours at 100 mm and 260° C. the reactor was returned to room temperature and pressure for overnight. The next day the reaction mixture was heated to 260° C. Vacuum was applied at 50 mm Hg for an additional six hours. At the end of this period the reactor was discharged and the following tests were carried out on the reaction product:

Acid number 22

Mettler Softening Point 111° C.

Complex Viscosity* @ 1 rad/sec 122 Poise

Tan delta* @ 16 rad/sec 0.83 pPeak pseudoplasticity* @ 16 rad/sec 0.57

Aliphatic dilutability using M-47 >1170%

*Measured with a Rheometrics Fluid Spectrometer at 25° C. on a 35% solution of resin in 1:1 Magiesol 47/Eastman TXIB.

Example 4

A 3 L resin kettle was charged with 526.6 g UNITOL® DT-22 DTO, 196.0 g HARCHEX® alcohols, 583.5 g p-tert-butyl phenol (Aldrich, Catalog No. B9,990-1), and 0.4 g Dow Coming FS1265 1000 cSt antifoam fluid. The kettle was fitted with a nitrogen supply, an air stirrer, a water-cooled condenser, and a thermocouple for temperature control and fitted into a heating mantel. The nitrogen supply was set to provide a blanket under the slight pressure of a mineral oil bubbler. The mixture was heated to 115° C. at which point it was homogeneous. At 115° C. the kettle was additionally charged with 147.2 g paraformaldehyde (Celanese) and 5.3 g magnesium oxide. The reaction was held at 106°–110° C. under the nitrogen blanket for four hours. At the end of this period the nitrogen blanket was replaced by a slow nitrogen flow while a Barrett trap was introduced to allow for the collection of reaction water. Temperature was increased to 200° C. then the reaction mixture discharged and allowed to cool. A portion of the reaction mixture (500 g) was then placed in a 1 L resin kettle, heated to 200° C., 42.5 g of monopentaerythritol was added, and the reaction mixture then heated to 260° C. while removing water. When an acid number of 49 was obtained, the nitrogen flow was stopped and vacuum was slowly applied to the reactor, reducing pressure to 100 mm Hg. After four hours at 100 mm and 260° C. the reactor was returned to room temperature and pressure for overnight. The next day the reaction mixture was heated to 260° C. and vacuum was applied at 100 mm Hg for five hours. At the end of this period the reactor was returned to room temperature and pressure. The next day the reaction mixture was heated to 260° C. and vacuum was applied at 80 mm Hg for six hours. At the end of this period the reactor was returned to room temperature and pressure. The next day the reaction mixture was heated to 260° C. and vacuum was applied at 80 mm for an additional four hours. At the end of this period the reactor was discharged and the following tests were performed, with the indicated results:

Acid number 18

Mettler Softening Point 117° C.

Complex Viscosity* @ 1 rad/sec 473 Poise

Tan delta* @ 16 rad/sec 0.37

Peak pseudoplasticity* @ 16 rad/sec 0.80

* Measured with a Rheometrics Fluid Spectrometer at 25° C. on a 35% solution of resin in 1:1 Magiesol 47/Eastman TXIB.

Example 5

A 1 L resin kettle was charged with 135.5 g UNITOL® DT-22 DTO, 45.0 g UNITOL® HYR rosin, 67.0 g HARCHEMEX® alcohols, 200.3 g p-tert-butyl phenol (Aldrich, Catalog No. B9,990-1), and 0.1 g Dow Corning FS1265 1000 cSt antifoam fluid. The kettle was fitted as in previous examples and the reaction mixture heated to 115° C. at which point it was homogeneous. At 115° C. the kettle was additionally charged with 50.5 g paraformaldehyde (Celanese) and 1.8 g magnesium oxide. The reaction was held at 106°–110° C. for four hours then to 200° C. as in the above examples. When 200° C. was reached the reactor was returned to room temperature. The next day the reaction mixture was heated to 200° C., 15.2 g of monopentaerythritol added and the reaction was heated to 260° C. while removing water. When a reaction temperature of 260° C. was obtained the reactor was returned to room temperature and pressure for overnight. The next day the reaction mixture was heated to 260° C. and vacuum was applied at 90 mm Hg for six hours. At the end of this period the reactor was returned to room temperature and pressure for overnight. The next day the reaction mixture was heated to 260° C. and vacuum was applied at 90 mm Hg for 6.6 hours. At the end of this period the reactor was returned to room temperature and pressure for overnight. The next day the reaction mixture was heated to 260° C. and vacuum was applied at 80 mm Hg for an additional 4.6 hours. At the end of this period the reactor was discharged and the following test results were obtained.

Acid number 16.7

Mettler Softening Point 133° C.

Complex Viscosity* @ 1 rad/sec 2201 Poise

Tan delta* @ 16 rad/sec 0.35

Peak pseudoplasticity* @ 16 rad/sec 0.81

* Measured with a Rheometrics Fluid Spectrometer at 25° C. on a 45% solution of resin in 1:1 Magiesol 47/Eastman TXIB.

Example 6

A 1 L resin kettle was charged with 90.5 g UNITOL® DT-22 DTO, 90.0 g UIMTOL® HYR rosin, 67.0 g HARCHEMEX® alcohols, 200.3 g p-tert-butyl phenol (Aldrich, Catalog No. B9,990-1), and 0.1 Dow Corning FS1265 100 cSt antifoam fluid. The kettle was fitted as in the above examples and heated to 115° C. at which point it was homogeneous. At 115° C. the kettle was additionally charged with 50.5 g paraformaldehyde (Celanese) and 1.8 g magnesium oxide. The reaction was held at 106°–110° C. for four hours then heated as in the above examples to 200° C. When 200° C. was reached the reactor was returned to room temperature for overnight. The following day the reaction mixture was heated to 200° C., 15.8 g of monopentaerythritol was added, and the reaction was heated to 260° C. while removing water. When an acid number of 40 was obtained the reactor was returned to room temperature and pressure for overnight. The next day the reaction mixture was heated to 260° C. Vacuum was applied at 90 mm Hg for 6.7 hours. At the end of this period the reactor was returned to room temperature and pressure for overnight. The next day the reaction mixture was heated to 260° C. Vacuum was applied at 90 mm Hg for an additional 3.3 hours. At the end of this period the reactor was returned to room temperature and pressure for overnight. The next day the reaction mixture was heated to 260° C. Vacuum was applied at 68 mm. Vacuum was maintained at between 68 and 95 mm Hg for an additional six hours. At the end of this period the reactor was returned to room temperature and pressure for overnight. The next day the reaction mixture was heated to 260° C. Vacuum was applied at 75 mm Hg. Vacuum was maintained between 75 and 102 mm Hg for an additional five hours. At the end of this period the reactor was discharged and the following tests were performed, providing the indicated results:

Acid number 14

Mettler Softening Point 155° C.

Complex Viscosity* @ 1 rad/sec 390 Poise

Tan delta* @ 16 rad/sec 1.30

Peak pseudoplasticity* @ 16 rad/sec 0.44

* Measured with a Rheometrics Fluid Spectrometer at 25° C. on a 45% solution of resin in 1:1 Magiesol 47/Eastman TXIB.

Example 7

This example shows that when higher levels of phenol are used, the reaction mass tends to gel if esterification with an alcohol is not carried out.

A 1 L reactor was fitted as in the above examples and charged with 270.0 g of UNITOL® DT-22 DTO, 240.0 g of p-tert-butylphenol, 72.1 g paraformaldehyde, and 2.1 g of MgO and heated to 110° C. for six hours. The reaction mixture was then heated as in the above examples to 260° C. with removal of water (but without the addition of any hydric materials) to yield a hard resin having a softening point of 104° C. and an acid number of 90. When heated further at 260° C. for 30 minutes under a vacuum of approximately 110 mm Hg, the reaction mass gelled.

Example 8

This example demonstrates the use of a dihydric alcohol to esterify a DTO-modified phenolic resin without gelation.

A 1 L reactor was fitted as in the above examples and charged with 360.0 g of p-tert-butylphenol (65 wt %), 108.2 g UNITOL® DT-22 DTO (19.5%), and 10.1 g ethylene glycol (1.8%). The reaction mixture was heated to 105° C. and 75.1 g paraformaldehyde (13.5%) and 1.1 g MgO were added. The reaction mixture was held at about 108° C. for five hours then heated gradually to 250° C. with distillation of water. The reaction mixture was held at 250° C. for six hours then placed under vacuum (60 mm Hg) for 1.5 hours and discharged. The product was a hard, brittle, ungelled resin.

Example 9

This example demonstrates the preparation of a "DTO phenolic oil" that is not a hard resin, useful in formulating lithographic inks because of its elasticity.

A 5 L reaction kettle was fitted as in the above examples and charged with 1,225 g UNITOL® DT-22 DTO, 1,225 g nonyl phenol, 212.5 g paraformaldehyde, and 8.3 g magnesium oxide. This reaction mixture was heated to 110° C. and held four hours then further heated with water distillation to 180° C. and poured. A 1 L reactor was then charged with 555.5 g of this product, 20.0 g pentaerythritol, and 45.0 g HARCHEMEX® alcohols. This reaction mixture was then heated over four hours to 260° C. under a gentle flow of nitrogen. At the end of this period the reactor was discharged. Upon cooling to room temperature, the product was a viscous oil having the following test properties:

Acid number 16

Complex Viscosity* @ 1 rad/sec 274 Poise

Peak pseudoplasticity* @ 16 rad/sec 0.57

* Measured with a Rheometrics Fluid Spectrometer at 25° C. on a 50% solution of resin in Magiesol 47 oil.

Example 10

A 1 L reactor was fitted as in the above examples and charged with 101.3 g of p-tert-butylphenol (15.0 wt %), 202.5 g UNITOL® DT-22 DTO (30.0%), 266.4 g UNITOL® HYR rosin and 1.5 g magnesium oxide (0.2%). The reaction mixture was heated until it became homogeneous then cooled to 115° C. and 41.4 g paraformaldehyde (6.1%) was added. The reaction mixture was held at about 110° C. for five hours then heated gradually to 180° C. with distillation of water. At this stage 8.1 g maleic anhydride was added and the reaction mixture held for one hour. Pentaerythritol (55.4 g) was then added, the reaction mixture heated gradually with water removal to 260° C., and vacuum applied until the acid number was reduced to 20. At the end of this period the reactor was discharged and the following test results were obtained:

Acid number 20

Mettler Softening Point 160° C.

Complex Viscosity* @ 1 rad/sec 378 Poise

Peak pseudoplasticity* @ 16 rad/sec 0.36

* Measured with a Rheometrics Fluid Spectrometer at 25° C. on a 45% solution of resin in 1:1 Magiesol 47/Eastman TXIB.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A composition prepared from reactants comprising Distilled Tall Oil, the Distilled Tall Oil comprising about 15–35 weight percent resin acids and about 20–45 weight percent fatty acids based on the weight of the Distilled Tall Oil, phenol-containing organic compound, formaldehyde or reactive equivalent thereof, and hydroxyl-containing non-phenolic organic compound.

2. The composition of claim 1 wherein the Distilled Tall Oil comprises resin acids, and a majority of the resin acids have a pimarane or isopimarane structure.

3. The composition of claim 1 wherein the Distilled Tall Oil comprises polycarboxylic acid having at least 36 carbon atoms.

4. The composition of claim 1 wherein the Distilled Tall Oil comprises more $C_{20}$ fatty acids than $C_{18}$ fatty acids, on a weight basis.

5. The composition of claim 1 wherein the phenol-containing organic compound is selected from phenol and derivatives of phenol wherein 1–3 aromatic phenol hydrogens are replaced with an equal number of substituents independently selected from hydroxyl, $C_1$–$C_{12}$ alkyl, $C_1$–$C_{12}$ alkyl substituted with 1 or 2 groups selected from hydroxyl and phenyl, phenyl, and phenyl substituted with 1 or 2 groups selected from hydroxyl and $C_1$–$C_{12}$ alkyl.

6. The composition of claim 5 wherein the phenol-containing organic compound is a para-$C_1$–$C_{12}$ alkylphenol.

7. The composition of claim 1 wherein the formaldehyde or reactive equivalent thereof is selected from formalin and paraformaldehyde.

8. The composition of claim 1 wherein the hydroxyl-containing organic compound is selected from the group $C_1$–$C_{36}$ monohydric compounds, $C_2$–$C_{36}$ dihydric compounds, $C_3$–$C_{36}$ trihydric compounds, $C_5$–$C_{36}$ tetrahydric compounds, $C_5$–$C_{36}$ pentahydric compounds and $C_6$–$C_{36}$ hexahydric compounds.

9. The composition of claim 8 wherein the hydroxyl-containing organic compound comprises an alcohol selected from butanol, hexanol, octanol, 2-ethylhexanol, 2-ethoxyethanol, decanol, hexadecanol, octadecanol, dodecanol, ethylene glycol, propylene glycol, diethylene glycol, triethylene glycol, butanediol, glycerol, trimethylolpropane, triethylolpropane, pentaerythritol, carbohydrate, dimerized trimethylolpropane, dimerized pentaerythritol and mixtures containing any of these listed alcohols.

10. The composition of claim 1 having a melting point of at least 90° C.

11. The composition of claim 10 having an acid number of less than 50.

12. The composition of claim 1 having a melting point of less than 40° C.

13. The composition of claim 12 having an acid number within the range of 70 to 150.

14. The composition of claim 1 which is self-gelling in an organic solvent.

15. The composition of claim 1 wherein the Distilled Tall Oil constitutes at least 50 weight percent of the total weight of the reactants.

16. The composition of claim 1 wherein the molar ratio of phenol-containing organic compound to formaldehyde or reactive equivalent ranges between 1:1 and 1:4.

17. The composition of claim 1 wherein the weight ratio of Distilled Tall Oil to the total weight of phenol-containing organic compound and formaldehyde or reactive equivalent thereof ranges between 1:3 and 1:0.5.

18. The composition of claim 1 the Distilled Tall Oil, phenol-containing organic compound, formaldehyde or reactive equivalent thereof and hydroxyl-containing non-phenolic organic compound constitute at least 60% of the total weight of the reactants.

19. The composition of claim 1 wherein the reactants further comprise a catalyst or reaction rate enhancer.

20. The composition of claim 19 wherein the catalyst or reactant rate enhancer is selected from metal oxides and salts of sodium, lithium calcium, magnesium or zinc with acetate, carbonate, bicarbonate, formate, hydroxide or oxalate.

21. The composition of claim 1 wherein the reactants further comprise rosin.

22. The composition of claim 21 wherein the rosin constitutes less than 50% of the total weight of the reactants.

23. The composition of claim 1 wherein the reactants further comprise one or more $\alpha,\beta$-unsaturated carbonyl compounds.

24. The composition of claim 23 wherein the $\alpha,\beta$-unsaturated carbonyl compound is selected from maleic anhydride, fumaric acid, mono($C_1$–$C_{12}$alkyl) ester of fumaric acid, di($C_1$–$C_{12}$alkyl) ester of fumaric acid, acrylic acid, $C_1$–$C_{12}$ alkyl ester of acrylic acid, methacrylic acid, $C_1$–$C_{12}$alkyl ester of methacrylic acid.

25. The composition of claim 1 wherein the reactants further comprise a hydrocarbon resin which is the polymerization product of $C_5$–$C_9$ hydrocarbons.

26. A composition prepared from reactants comprising polycarboxylic acid having at least 36 carbon atoms, phenol-containing organic compound, formaldehyde or reactive equivalent thereof, and hydroxyl-containing non-phenolic organic compound.

27. A process for preparing a Distilled Tall Oil-modified phenolic resin comprising heating, within a temperature range of 100°–300° C., reactants comprising Distilled Tall Oil, the Distilled Tall Oil comprising about 15–35 weight percent resin acids and about 20–45 weight percent fatty acids based on the weight of the Distilled Tall Oil, phenol-containing organic compound, formaldehyde or reactive equivalent thereof, and hydroxyl-containing non-phenolic organic compound.

28. In a process for preparing a rosin-phenolic resin from rosin, phenol-containing organic compound, formaldehyde or reactive equivalent thereof, and hydroxyl-containing non-phenolic organic compound, the improvement comprising including Distilled Tall Oil, the Distilled Tall Oil comprising about 15–35 weight percent resin acids and about 20–45 weight percent fatty acids based on the weight of the Distilled Tall Oil among the reactants.

29. An ink composition comprising colorant and a resin prepared from reactants comprising Distilled Tall Oil, the Distilled Tall Oil comprising about 15–35 weight percent resin acids and about 20–45 weight percent fatty acids based on the weight of the Distilled Tall Oil, phenol-containing organic compound, formaldehyde or reactive equivalent thereof, and hydroxyl-containing non-phenolic organic compound.

* * * * *